United States Patent
Motier et al.

(10) Patent No.: US 6,894,088 B2
(45) Date of Patent: May 17, 2005

(54) PROCESS FOR HOMOGENIZING POLYOLEFIN DRAG REDUCING AGENTS

(75) Inventors: John F. Motier, Broken Arrow, TX (US); Lo-Chien Chou, Tulsa, OK (US); Chee Ling Tong, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 121 days.

(21) Appl. No.: 10/395,416

(22) Filed: Mar. 24, 2003

(65) Prior Publication Data

US 2004/0254266 A1 Dec. 16, 2004

(51) Int. Cl.$^7$ .............................. C08J 3/11; C08J 3/05; C08K 5/10; C08K 5/07; C08K 5/06
(52) U.S. Cl. ..................... 523/175; 523/309; 208/370
(58) Field of Search ................. 523/175, 309; 137/13; 241/16, 21; 208/370

(56) References Cited

U.S. PATENT DOCUMENTS

| | | |
|---|---|---|
| 3,884,252 A | 5/1975 | Kruka |
| 3,966,655 A | 6/1976 | Kovacs et al. |
| 4,177,177 A | 12/1979 | Vanderhoff et al. |
| 4,212,312 A | 7/1980 | Titus |
| 4,263,926 A | 4/1981 | Drake et al. |
| 4,340,076 A | 7/1982 | Weitzen |
| 4,499,214 A | 2/1985 | Sortwell |
| 5,244,937 A | 9/1993 | Lee et al. |
| 5,376,697 A | 12/1994 | Johnston et al. |
| 5,449,732 A | 9/1995 | Smith et al. |
| 5,504,131 A | 4/1996 | Smith et al. |
| 5,504,132 A | 4/1996 | Smith et al. |
| 5,539,044 A | 7/1996 | Dindi et al. |
| 5,733,953 A | 3/1998 | Fairchild et al. |
| 6,172,151 B1 | 1/2001 | Johnston et al. |
| 6,241,472 B1 | 6/2001 | Bosch et al. |
| 6,399,676 B1 | 6/2002 | Labude et al. |
| 6,649,670 B1 * | 11/2003 | Harris et al. ................. 523/175 |
| 6,765,053 B2 | 7/2004 | Labude et al. |
| 2001/0049402 A1 | 12/2001 | Foster |
| 2002/0065352 A1 | 5/2002 | Johnston et al. |

FOREIGN PATENT DOCUMENTS

| | | |
|---|---|---|
| CA | 675522 | 12/1963 |
| EP | 0196350 B1 | 10/1986 |
| EP | 0 885 259 B1 | 12/2003 |
| WO | WO-01/88031 A1 | 11/2001 |
| WO | WO 02/059183 A2 | 8/2002 |
| WO | WO 02/062875 A1 | 8/2002 |
| WO | WO-02/101282 A2 | 12/2002 |
| WO | WO 03/029330 A1 | 4/2003 |
| WO | WO 03/029331 A1 | 4/2003 |

OTHER PUBLICATIONS

PCT International Search Report for International Application No. PCT/US2004/007115, Aug. 6, 2004.

* cited by examiner

*Primary Examiner*—Matthew A. Thexton
(74) *Attorney, Agent, or Firm*—Madan, Mossman & Sriram P.C.

(57) ABSTRACT

A process for producing polymer drag reducing agent (DRA) slurries without cryogenic temperatures or conventional grinding is described. The homogenizing or size reduction of polymer, such as poly(alpha-olefins), may be achieved by the use of granulated polymer and at least one liquid, non-solvent for the polymer DRA. In one non-limiting embodiment of the invention, the homogenizing is conducted at ambient temperature. Examples of suitable non-solvents include water and non-aqueous non-solvents including, but not necessarily limited to, alcohols, glycols, glycol ethers, ketones, and esters; having from 2–6 carbon atoms, and combinations thereof. The polymeric DRA may be homogenized to an average particle size of about 600 microns or less.

16 Claims, No Drawings

PROCESS FOR HOMOGENIZING POLYOLEFIN DRAG REDUCING AGENTS

FIELD OF THE INVENTION

The invention relates to processes for directly producing slurries of finely divided polymeric drag reducing agents, and most particularly to processes for producing slurries of fine particulates of polymeric drag reducing agents that do not require grinding of the solid polymeric drag reducing agent, cryogenically or otherwise.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAB have taken various forms in the past, including slurries or dispersions of ground polymers to form free-flowing and pumpable mixtures in a liquid medium. A problem generally experienced with simply grinding the polyalpha-olefins (PAOs) is that the particles will "cold flow" or stick together after the passage of time, thus making it impossible to place the PAO in the hydrocarbon liquid where drag is to be reduced, in a form of suitable surface area, and thus particle size, that will dissolve or otherwise mix with the hydrocarbon in an efficient manner. Further, the grinding process or mechanical work employed in size reduction can sometimes degrade the polymer, thereby reducing the drag reduction efficiency of the polymer.

The usual grinding procedure requires cryogenic conditions to reduce the dry solid polymeric drag reducing agent to a fine particle size. Cryogenic conditions are defined herein as operating the grinding process at or below the glass transition temperature of the polymer.

Gel or solution DRAs (those polymers essentially being in a viscous solution with hydrocarbon solvent) have also been tried in the past. However, these drag reducing gels demand specialized injection equipment, as well as pressurized delivery systems. The gels or the solution DRAs are stable and have a defined set of conditions that have to be met by mechanical equipment to pump them, including, but not necessarily limited to viscosity, vapor pressure, undesirable degradation due to shear, etc. The gel or solution DRAs are also limited to about 10% activity of polymer as a maximum concentration in a carrier fluid due to the high solution viscosity of these DRAs. Thus, transportation costs of present DRAs are considerable, since up to about 90% of the volume being transported and handled is inert material.

Canadian patent 675,522 involves a process of comminuting elastomeric material for the production of small particles that includes presenting a large piece of elastomeric material to a comminuting device, feeding powdered resinous polyolefin into the device, comminuting the elastomeric material in the presence of the powdered polyolefin and recovering substantially free-flowing comminuted elastomeric material.

A polymer emulsification process comprising intimately dispersing a liquified water insoluble polymer solution phase in an aqueous liquid medium phase containing at least one nonionic, anionic or cationic oil-in-water functioning emulsifying agent, in the presence of a compound selected from the group consisting of those hydrocarbons and hydrocarbyl alcohols, ethers, alcohol esters, amines, halides and carboxylic acid esters which are inert, non-volatile, water insoluble, liquid and contain a terminal aliphatic hydrocarbyl group of at least about 8 carbon atoms, and mixtures thereof are described in U.S. Pat. No. 4,177,177. The resulting crude emulsion is subjected to the action of comminuting forces sufficient to enable the production of an aqueous emulsion containing polymer solution particles averaging less than about 0.5 microns in size. The polymers of this patent are not identified as or suggested to be drag reducing polymers.

A technique for extremely rapid dissolution or dispersion on essentially the molecular level, of certain polymeric materials in compatible liquid vehicles is described in U.S. Pat. No. 4,340,076. The polymeric materials are comminuted at cryogenic temperatures and are then introduced into a liquid vehicle preferably while still at or near cryogenic temperatures. At low concentrations, the resulting blend or system displays reduced friction to flow while high concentrations may be used to immobilize the liquid vehicle and/or reduce its vapor pressure.

From reviewing the foregoing prior patents it can be appreciated that considerable resources have been spent on both chemical and physical techniques for easily and effectively delivering drag reducing agents to the fluid that will have its friction reduced. Yet none of these prior methods has proven entirely satisfactory. Thus, it would be desirable if a drag reducing agent could be developed which rapidly dissolves in the flowing hydrocarbon (or other fluid), which could minimize or eliminate the need for special equipment for preparation and incorporation into the hydrocarbon, and which could be formulated to contain much greater than 10% polymer. If the DRA product contains only 10% polymer, considerable cost is involved in shipping, storing and delivering the other 90% of the material that is essentially inert, i.e. does not function as a drag reducer. It would also be desirable to have a process for producing a slurry of particulate drag reducing agent that did not require cryogenic grinding of the solid polymer prior to slurry formulation.

SUMMARY OF THE INVENTION

An object of the invention is to provide a process for producing a slurry of a particulate polymer drag reducing agent of suitable small particle size and adequate surface area that will readily dissolve and dissipate in flowing hydrocarbon streams.

Other objects of the invention include providing a particulate polymer DRA in slurry form that can be readily manufactured and which does not require cryogenic temperatures to be produced.

Another object of the invention is to provide a particulate polymer DRA in slurry form that does not cold flow upon standing once it is made.

In carrying out these and other objects of the invention, there is provided, in one form, a method for producing a polymer drag reducing agent (DRA) slurry that involves feeding to a homogenizer components including a granulated polymer DRA and a liquid non-solvent for the polymer DRA. These components are homogenized to reduce the particle size of the polymer DRA to yield a polymer DRA slurry.

In another non-limiting embodiment of the invention, there is provided a method for producing a slurry of particulate polymer drag reducing agent that involves feeding to a high shear homogenizer a granulated polymer suspended in a non-solvent for the polymer. The homogenizer includes stator and rotor components. The polymer may have been granulated using a solid or a liquid anti-agglomeration agent or a combination thereof. The Components are then homogenized through the high shear stator-rotor device to produce a slurry of finely divided particulate polymer drag reducing agent in a non-solvent for the polymer. In one non-limiting embodiment of the invention, cryogenic temperatures are not used in the process. In another aspect of the invention, the invention includes the particulate polymer drag reducing slurry made by this process.

DETAILED DESCRIPTION OF THE INVENTION

In one non-limiting embodiment, the invention concerns the preparation of drag reducing slurry products of high molecular weight polymer particles using multi-stage rotor/stator mixers. In the context of this invention, these machines are defined as "homogenizers". In another non-limiting embodiment of the invention, homogenizers include at least one rotor-stator combination, and the material being homogenized is cycled through the homogenizer in multiple passes until the desired average particle size is reached. Suitable homogenizers include, but are not necessarily limited to Ross QUAD-X Series mixers and MEGASHEAR homogenizers available from Ross Mixers, Inc.; MEGA-TRON in-line homogenizing processors from Kinematic, Inc. and the like. In one important non-limiting embodiment of the invention, the formation of the slurry is conducted in the absence of conventional grinding, particularly in the absence of cryogenic grinding.

Homogenizing is a physical, mechanical size reduction process distinct from grinding. Homogenizing reduces polymer particle size with little or no degradation or undesired breaking of the polymer chains, and creates a colloidal system that is unaffected by gravity. In one non-limiting embodiment the size reduction is accomplished by passing the polymer through a homogenizer or colloid mill, a machine having small channels, under a pressure of e.g. 2000–2500 psi (about 14,000–17.000 kPa) at a speed of approximately 700 ft/sec (about 210 m/sec), in one non-limiting embodiment. The forces involved include shear, impingement, distention, and cavitation. Grinding, by contrast, can sometimes damage and undesirably break and degrade the polymer chains during size reduction. it is also a physical or mechanical process that crushes bits or particles between two hard surfaces.

In one non-limiting embodiment of this invention, the homogenizing for producing particulate polymer drag reducing agent is conducted at non-cryogenic temperatures. For the purposes of this invention, cryogenic temperature is defined as the glass transition temperature ($T_g$) of the particular polymer having its size reduced or being homogenized, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. In another non-limiting embodiment of the invention, the homogenizing for producing the slurry of particulate polymer drag reducing agent is conducted at ambient temperature. For the purposes of this invention, ambient temperature conditions are defined as between about 20–25° C. (about 68–77° F.). In another non-limiting embodiment of the invention, ambient temperature is defined as the temperature at which homogenizing occurs without any added cooling. Because heat is generated in the homogenizing process, "ambient temperature" may thus in some contexts mean a temperature greater than about 20–25° C. (about 68–77° F.), in one non-limiting example from about 25 to about 80° C. In still another non-limiting embodiment of the invention, the homogenizing to produce particulate polymer drag reducing agent is conducted at a chilled temperature that is less than ambient temperature, but that is greater than cryogenic temperature for the specific polymer being ground. A preferred chilled temperature may range from about −7 to about 2° C. (about 20 to about 35° F.), in one non-limiting embodiment of the invention.

Generally, the polymer that is processed in the method of this invention may be any conventional or well known polymeric drag reducing agent (DRA) including, but not necessarily limited to, poly(alpha-olefin), polychloroprene, vinyl acetate polymers and copolymers, poly(alkylene oxide), and mixtures thereof and the like. For the method of this invention to be successful, the polymeric DRA would have to be of sufficient structure (molecular weight) to exist as a neat solid which would lend itself to the homogenizing, i.e. that of being sheared by mechanical forces to smaller particles.

Poly(alpha-olefin) is a preferred polymer in one non-limiting embodiment of the invention. Poly(alpha-olefins) (PAOs) are useful to reduce drag and friction losses in flowing hydrocarbon pipelines and conduits. Prior to the process of this invention, the polymer has already been granulated, that is, broken up or otherwise fragmented into granules in the range of about 6 mm to about 20 mm, preferably from about 8 mm to about 12 mm. It is permissible for the granulated polymer to have an anti-agglomeration agent thereon. Such anti-agglomeration agents include, but are not necessarily limited to talc, alumina, ethylene bis-strearamide, polyethylene waxes, lower molecular PAOs and the like and mixtures thereof.

Within the context of this invention, the term "granulate" refers to any size reduction process that produces a product that is relatively larger than that produced by homogenizing. Further within the context of this invention, "homogenizing" refers to a size reduction process that gives a product distinctly smaller than that produced by "granulation". An advantage of homogenization is that little or no degradation of the polymer occurs during the process, as contrasted with some other methods of size reduction.

The solid organic anti-agglomeration agent (also known as processing aids) may be any finely divided particulate or powder that inhibits, discourages or prevents particle agglomeration and/or gel ball formation during homogenizing. The solid organic processing aid may also function to provide the shearing action necessary in the size reduction step to achieve polymer particles of the desired size. The solid organic processing aid itself has a particle size, which in one non-limiting embodiment of the invention ranges from about I to about 50 microns, preferably from about 10 to about 50 microns. Suitable solid organic processing aids include, but are not necessarily limited to, ethene/butene copolymer (such as Microthene, available from Equistar, Houston), paraffin waxes (such as those produced by Baker Petrolite), solid, high molecular weight alcohols (such as Unilin alcohols available from Baker Petrolite), and any non-metallic, solid compounds composed of C and H, and optionally N and/or S which can be prepared in particle sizes of 10–50 microns suitable for this process, and mixtures thereof.

The non-solvent provides lubricity to the system during homogenizing. Specific examples of non-solvents include, but are not necessarily limited to, a blend of a glycol with water and/or an alcohol. Suitable glycols include, but are not necessarily limited to, ethylene glycol, propylene glycol, diethylene glycol, dipropylene glycol, methyl ethers of such glycols, and the like, and mixtures thereof. Suitable alcoholic liquids include, but are not necessarily limited to, methanol, ethanol, isopropanol (isopropyl alcohol, IPA), hexanol and the like and mixtures thereof. In another non-limiting embodiment of the invention, the non-solvent includes, but is not necessarily limited to, alcohols, glycols, glycol ethers, ketones, and esters; where the non-solvent has from 2–6 carbon atoms, and water and combinations thereof. In one non-limiting embodiment of the invention, the non-solvent is a blend of an ether and an alcohol, in weight proportions ranging from about 70/30 to about 30/70, and in another non-limiting embodiment ranging from about 60/40 to about 40/60.

In one non-limiting embodiment of the invention, the proportion of granulated polymer DRA to the non-solvent ranges from about 5 to about 40 wt %, based on the total combination. In another non-limiting embodiment, the proportion of granulated polymer DRA to the non-solvent ranges from about 20 to about 50wt %.

In one non-limiting embodiment of the invention, it is expected that the processes described herein will produce particulate polymer drag reducing agent product where the average particle size is less than about 500 microns, preferably where at least 90wt % of the particles have a size of less than about 500 microns or less, 100wt. percent of the particles have a size of 600 microns or less, and most preferably 60wt. % of the particles have a size of 297 microns or less in non-limiting embodiments. One achievable distribution is shown in Table I, but other distributions are certainly possible, and the invention is not necessarily limited to this particular embodiment:

TABLE I

| Micron Retained | Screen Mesh Size | Percent |
| --- | --- | --- |
| 500 | 35 | 38.8 g |
| 297 | 50 | 55.7 g |
| 210 | 70 | 4.1 g |
| 178 | 80 | 0.4 g |
| 150 | 100 | 0.4 g |
| pan | pan | 0.6 g |

It is expected that the resulting polymer DRA slurries can be easily transported without the need of including an inert solvent, and that the polymer DRA slurries can be readily inserted into and incorporated within a flowing hydrocarbon, aqueous fluid, oil-in-water emulsion or water-in-oil emulsion, as appropriate. DRA products made by the process of this invention are free-flowing and contain a high percentage, from about 5 to about 30% of active polymer.

Other components of the slurry product may include, but are not necessarily limited to, emulsifiers, surfactants and other surface-tension reducers. Suitable emulsifiers for this invention include, but are not necessarily limited to, alcohol ethoxylates, alkyl aromatic sulfonates and the like. Other optional additives to the slurry include polymers or cellulosic derivatives soluble in the carrier fluid or activated clays. However, in one non-limiting embodiment of the invention, the slurry has an absence of an emulsifier or emulsifying agent. In the embodiment where an emulsifier is not used, the homogenizer can nevertheless produce a stable emulsion or slurry in the absence of an added emulsifier. In another non-limiting embodiment, the slurry is not an emulsion. In still another non-limiting embodiment of the invention, the slurry has an absence of water. In this last embodiment, the liquid, non-solvent does not include water.

The invention will now be further described with respect to specific examples that are provided only to further illustrate the invention and not limit it in any way.

EXAMPLE 1

A coarse slurry of 20% by weight of a granulated bulk polymerized PAO suspended in a 50/50 (w/w) mixture of propylene glycol monomethyl ether and 1-hexanol were passed through a MEGASHEAR homogenizer manufactured by Charles Ross & Son, Hauppauge, N.Y. After 3 passes the particle size had been substantially reduced and no degradation in the polymer's ability to effect drag reduction was observed as a result of the homogenizing. The average particle size of the homogenized PAO was about 300 microns.

EXAMPLE 2

In another run, a coarse slurry was formulated from solution polymerized PAO which had been precipitated into coarse particles by combining with a non-solvent of the type previously mentioned. This slurry was circulated through the MEGASHEAR homogenizer and the particle size substantially reduced. The average particle size of the homogenized PAO was about 200 microns.

Many modifications may be made in the composition and process of this invention without departing from the spirit and scope thereof that are defined only in the appended claims. For example, the exact nature of, size of and proportions of granulated polymer DRA and the nature of and proportion of the non-solvent may be different from those used here. Particular processing techniques may be developed to enable the components to be homogeneously blended and work together well, yet still be within the scope of the invention. Additionally, feed rates of the various components are expected to be optimized for each type of homogenizing equipment and for each combination of components employed. It is also expected that the ambient grinding techniques of U.S. patent application Ser. No. 10/322,050, incorporated by reference herein, may be used to form particulate polymer DRAs that could be incorporated into slurries such as those of this invention.

We claim:

1. A method for producing a polymer drag reducing agent (DRA) slurry, comprising:
   feeding to a homogenizer components comprising:
      a granulated polymer DRA; and
      at least one liquid, non-solvent for the polymer DRA; and
   homogenizing the components to reduce the particle size of the polymer DRA to yield a polymer DRA slurry in the absence of cryogenic temperatures.

2. The method of claim 1 where in the feeding, the granulated polymer DRA has an average particle size between about 6 mm and about 20 mm.

3. The method of claim 1 where in the feeding, the granulated polymer DRA is poly(alpha-olefin).

4. The method of claim 1 where in homogenizing the components, the average particle size of the homogenized polymer DRA is equal to or less than about 600 microns.

5. The method of claim 1 where the feeding and homogenizing are conducted at ambient temperatures.

6. The method of claim 1 where the liquid, non-solvent is selected from the group of compounds consisting of alcohols, glycols, glycol ethers, ketones, and esters; where the non-solvent has from 2–6 carbon atoms, water and combinations thereof.

7. A method for producing a polymer drag reducing agent (DRA) slurry, comprising:
   feeding to a homogenizer components comprising:
      a granulated polymer DRA that is poly(alpha-olefin); and at least one liquid, non-solvent for the polymer DRA, where the liquid, non-solvent is selected from the group of compounds consisting of alcohols, glycols, glycol ethers, ketones, and esters; where the non-solvent has from 2–6 carbon atoms, water and combinations thereof; and homogenizing the components to reduce the particle size of the polymer DRA to yield a polymer DRA slurry in the absence of cryogenic temperatures.

8. The method of claim 7 where in the feeding, the granulated polymer DRA has an average particle size between about 6 mm and about 20 mm.

9. The method of claim 7 where in homogenizing the components, the average particle size of the homogenized polymer DRA is equal to or less than about 600 microns.

10. The method of claim 7 where the feeding and homogenizing are conducted at ambient temperatures.

11. A polymer drag reducing agent (DRA) slurry made by a method comprising:

feeding to a homogenizer components comprising:
a granulated polymer DRA that is poly(alpha-olefin); and
at least one liquid, non-solvent for the polymer DRA; and homogenizing the components to reduce the particle size of the polymer DRA to yield a polymer DRA slurry.

12. The polymer DRA slurry of claim 11 where in the feeding, the granulated polymer DRA has an average particle size between about 6 mm and about 20 mm.

13. The polymer DRA slurry of claim 11 where the homogenizing is conducted in the absence of cryogenic temperatures.

14. The polymer DRA slurry of claim 11 where the average particle size of the homogenized polymer DRA is equal to or less than about 600 microns.

15. The polymer DRA slurry of claim 11 where the feeding and homogenizing are conducted at ambient temperatures.

16. The polymer DRA slurry of claim 11 where the liquid, non-solvent is selected from the group of compounds consisting of alcohols, glycols, glycol ethers, ketones, and esters; where the non-solvent has from 2–6 carbon atoms, water and combinations thereof.

* * * * *

UNITED STATES PATENT AND TRADEMARK OFFICE
CERTIFICATE OF CORRECTION

PATENT NO. : 6,894,088 B2
DATED : May 17, 2005
INVENTOR(S) : Motier et al.

It is certified that error appears in the above-identified patent and that said Letters Patent is hereby corrected as shown below:

<u>Title page,</u>
Item [75], Inventors, delete "Lo Chien Chou" and insert -- Lu-Chien Chou --.

<u>Column 1,</u>
Line 19, please delete "DRAB" and insert -- DRAs --.

<u>Column 2,</u>
Line 67, please delete "Components" and insert -- components --.

<u>Column 3,</u>
Line 35, after "pressure of", please insert -- from ambient up to --.
Line 41, please delete "it" and insert -- It --.

<u>Column 4,</u>
Line 51, please delete "I" and insert -- 1 --.

Signed and Sealed this

Sixth Day of December, 2005

JON W. DUDAS
*Director of the United States Patent and Trademark Office*